United States Patent
Morris et al.

(10) Patent No.: US 6,383,959 B1
(45) Date of Patent: May 7, 2002

(54) FABRIC FOR DIVERTING AIR FLOW IN AN AUTOMOTIVE AIR CONDITIONING SYSTEM

(75) Inventors: David D. Morris, Newnan, GA (US); Shulong Li, Spartanburg, SC (US); Jules A. Haneburger, Newnan, GA (US)

(73) Assignee: Milliken & Company, Spartnaburg, SC (US)

( * ) Notice: Subject to any disclaimer, the term of this patent is extended or adjusted under 35 U.S.C. 154(b) by 0 days.

(21) Appl. No.: 09/532,430

(22) Filed: Mar. 23, 2000

(51) Int. Cl.⁷ .............................. B32B 5/08; B32B 3/00; B32B 5/02; B32B 9/00; B32B 27/02
(52) U.S. Cl. .......................... 442/218; 442/59; 442/97; 442/164; 442/203; 428/137
(58) Field of Search ............................ 442/59, 97, 164, 442/203, 218; 428/137

(56) References Cited

U.S. PATENT DOCUMENTS

| | | | |
|---|---|---|---|
| 5,154,223 A | 10/1992 | Ishimary et al. | 165/42 |
| 5,251,853 A | * 10/1993 | Ogawa et al. | 244/145 |
| 5,997,071 A | * 12/1999 | Mazarelli | 296/136 |
| 6,291,040 B1 | * 9/2001 | Moriwaki et al. | 428/35.2 |

FOREIGN PATENT DOCUMENTS

| | | | |
|---|---|---|---|
| DE | 4118552 A1 | * 12/1992 | |
| EP | 0 705 725 B1 | 10/1995 | B60H/1/00 |
| JP | 405201234 A | * 8/1993 | |

OTHER PUBLICATIONS

Publication: Nonoyama, Sugi, Morita, Higashihara, Kosaka, and Nishimura; Title: "Development of a Film Door Type Air Conditioning Unit", 1996.

* cited by examiner

Primary Examiner—Terrel Morris
Assistant Examiner—Norca L. Torres
(74) Attorney, Agent, or Firm—Terry T. Moyer; Jeffery E. Bacon

(57) ABSTRACT

A fabric positioned within an automotive air conditioning system to direct the flow of air from a supply manifold to a distribution manifold. The fabric includes apertures provide different combinations of airflow directions at different longitudinal positions of the fabric. The fabric has warp and fill yarns combined in a satin weave, and a coating. The fabric is positioned so that the float of the fill yarns is oriented in the same direction as the longitudial direction of the fabric.

14 Claims, 2 Drawing Sheets

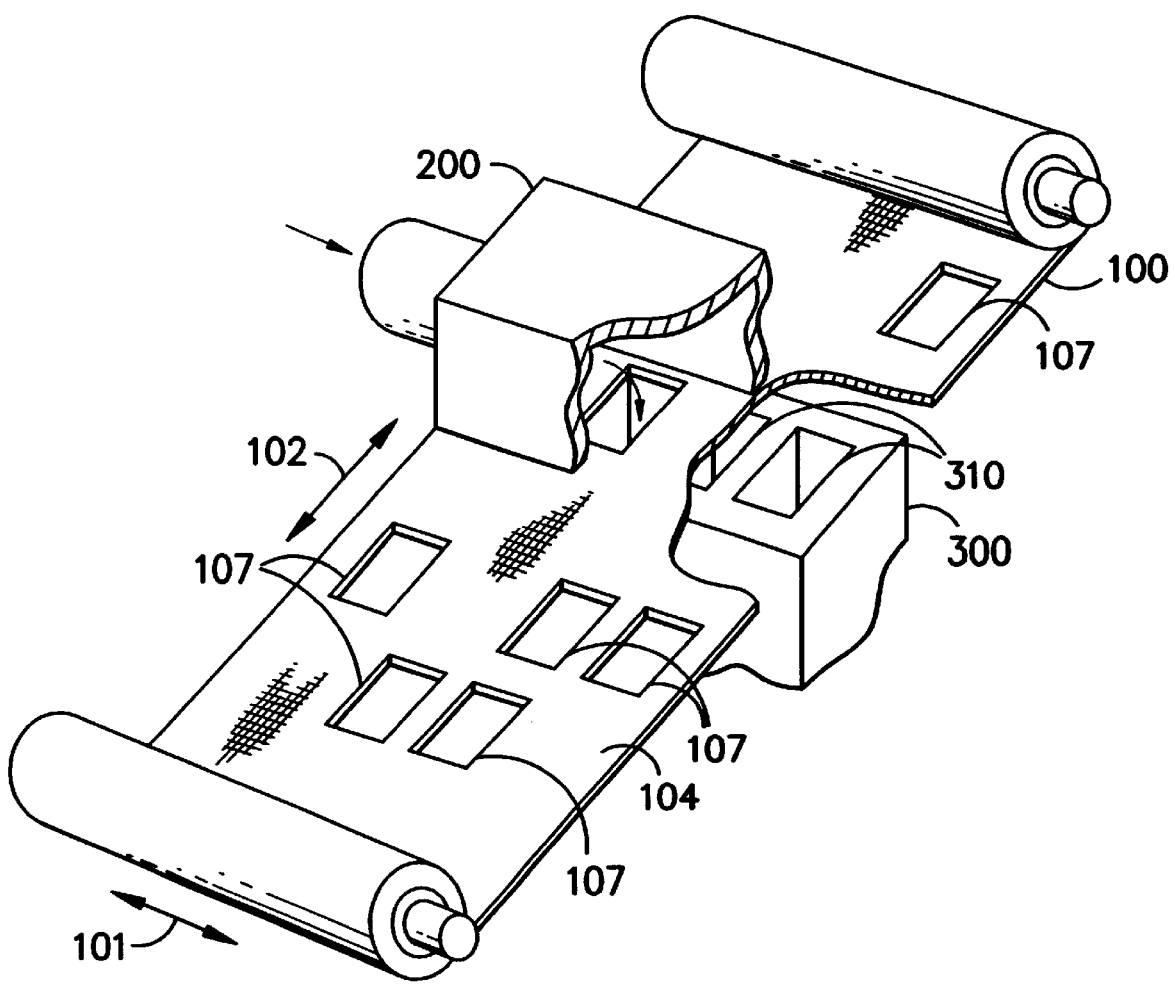
FIG. -1-

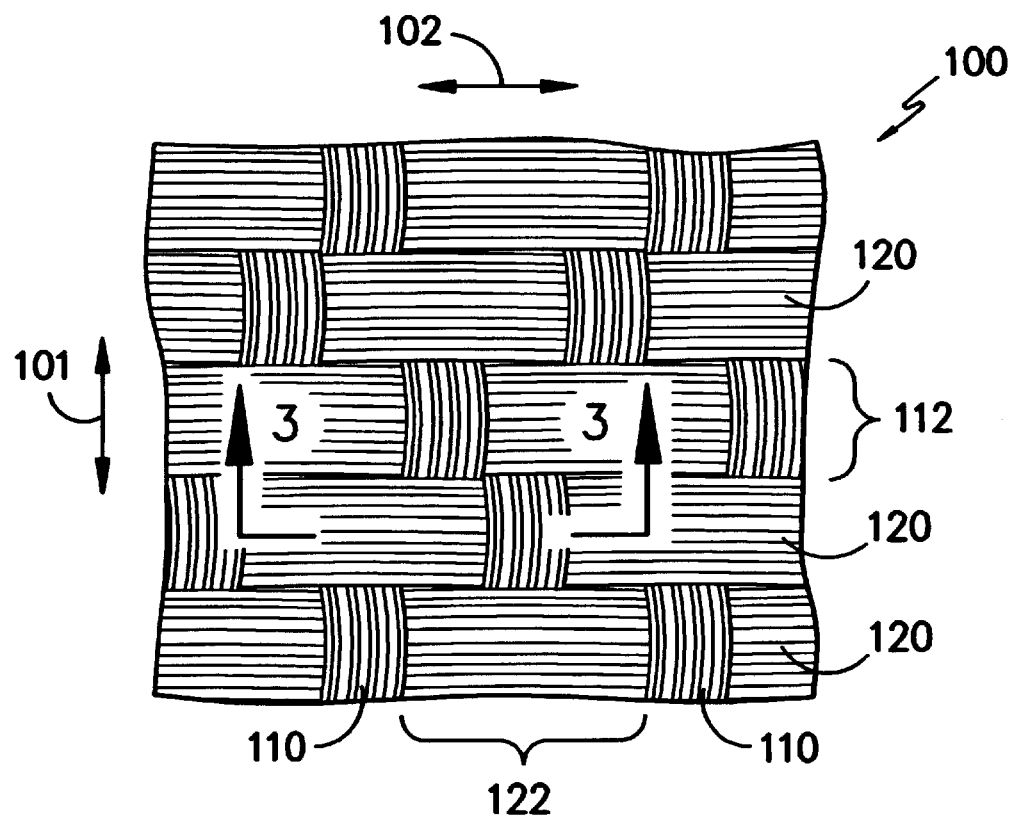
FIG. -2-
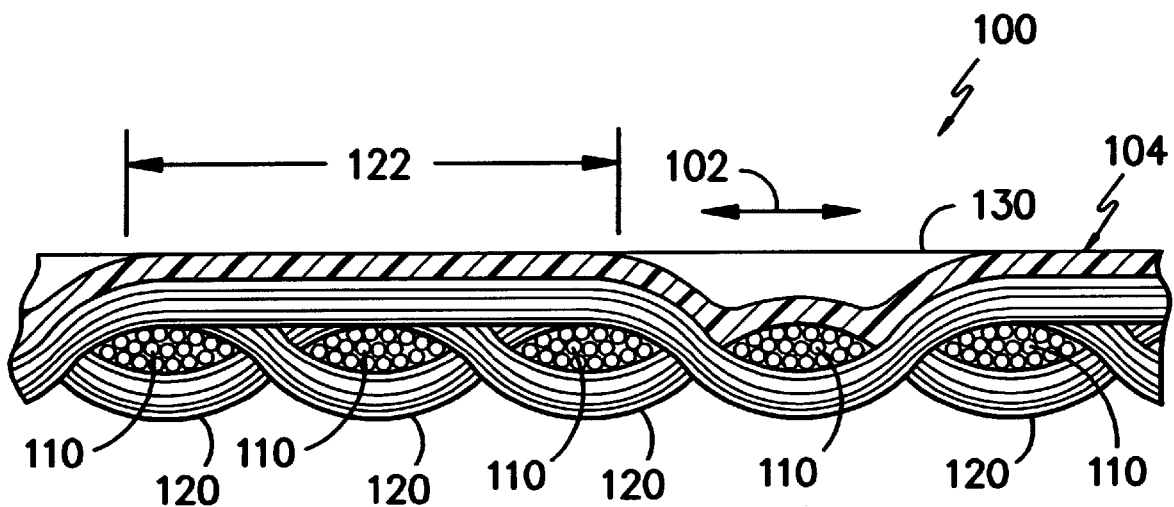
FIG. -3-

FABRIC FOR DIVERTING AIR FLOW IN AN AUTOMOTIVE AIR CONDITIONING SYSTEM

BACKGROUND

The present invention relates to fabrics used in automobiles, and in particular to fabrics used in automobiles to divert airflow Air flow in an automotive heating and air conditioning systems typically use doors to direct air flow. However, doors require substantial space and have limited versatility. Therefore, there is a need for alternative means for diverting airflow in an automotive air conditioning system.

European Patent Application Publication No. EP 0 705 725 A1, published on Oct. 04, 1996, illustrates the use of a fabric as a film door for an automotive air conditioning system, the film having a specific rigidity to enhance the seal of the film to the air conditioning system and to reduce the energy required by the motor for moving the film. An article titled "Development of a Film Door Type Air Conditioning Unit" published by authors Hiroshi Nonyama, Hikaru Sugi, Takayuki Morita, Akihito Higashihara, Atsuski Kosaka, and Yoji Nishimura, in an article copyrighted in 1996 by the Society of Automotive Engineers, Inc., the addressed various issues involving the use of a film as a flow control door for an automotive air conditioning system. However, these prior art publications leave room for improvement of the film used as a flow control door is an automotive air conditioning system.

SUMMARY

The present invention is directed to a fabric for use in directing airflow in an automotive air conditioning system, the fabric being a satin weave with a coating on the engaging surface of the fabric. The float of the satin weave is aligned in the direction of travel for the fabric.

BRIEF DESCRIPTION OF THE DRAWINGS

The invention will be described below by way of example only, with reference to the accompanying drawings, in which:

FIG. 1 is a partial fragmented view of an automotive air conditioning system incorporating the present invention;

FIG. 2 is an enlarged plan view of a portion of the fabric 100 in FIG. 1; and

FIG. 3 is an enlarged cross section of the fabric in FIG. 2, taken about the section lines 3—3.

DETAILED DESCRIPTION

A fabric 100 for use as a baffle to divert air flow in an automotive air conditioning system is illustrated in FIGS. 1, 2, and 3. FIG. 1 is a partial fragmented view illustrating the fabric 100 in use with a supply manifold 200 and a distribution manifold 300. FIG. 2 is an enlarged plan view of a portion of the fabric 100 in FIG. 1. FIG. 3 is an enlarged cross-sectional view of the fabric 100, taken about the section lines 3—3 in FIG. 2. The fabric 100 is an air impermeable fabric with a longitudinal direction 102 a transverse direction 101, and a glide surface 104. A series of apertures 107 perforate the fabric 100 in select locations.

In an operational position, the fabric 100 is located between the supply manifold 200 and the distribution manifold 300. The distribution manifold 300 inclues a series of separate passages 310 for the distribution of the conditioned air from the supply manifold 200 to various locations of the vehicle. The glide surface 104 of the fabric 100 passes over the supply manifold 200 in the longitudinal direction 102. Although the fabric 100 has been illustrated as having the glide surface 104 engaging the supply manifold 200, the glide surface 104 can alternatively engage the distribution manifold 300.

The aperatures 107 in the fabric 100 regulate which of the passages 310 in the distribution manifold 300 receive the conditioned air from the supply manifold 200. The aperatures 107 are disposed in the fabric 100 such that, when the fabric 100 is located at different longitudinal positions on the supply manifold 200, a different combination of distribution passages 310 receive conditioned air from the supply manifold 200. In order to maintain a good seal with the supply manifold 200, the fabric 100 must have good dimensional stability (creep resistance) and have resistance to warping. It is desirable to have a low coefficient of friction between the fabric 100 and the supply manifold 200 to facilitate changing the position of the fabric 100, thereby changing the combination of the distribution passages 310 that receive the conditioned air from the supply manifold 200. Additionally, it is desired to have the fabric 100 generate as little as possible of noise when moving over the supply manifold 200.

The fabric 100 generally includes warp yarns 110, fill yarns 120, and a coating 130. The warp yarns 110 and the fill yarns 120 are flat filament yarns combined into a satin weave. In one preferred embodiment, it is preferred that the warp yarns 110 and the fill yarns 120 are synthetic, continuous, multifilament, non-texturized yarns, as these yarns tend to provide better dimensional stability and creep resistance. In a further prefered embodiment, the warp yarn 110 and the fill yarn 120 are both polyester yarns, as these yarns also tend to have a low sensitivity to moisture.

The warp yarns 110, as illustrated, are warp drawn. The warp yarns 110 are also generally aligned with the transverse direction 101 of the fabric 100, and the fill yarns 120 are generally aligned with the longitudinal direction 102 of the fabric 100. A warp float 112 of the warp yarns 110, due to the satin weave, is generally aligned with the transverse direction 101 on the glide surface 104 of the fabric 100. A fill float 122 of the fill yarns 120, due to the satin weave, is generally aligned with the longitudinal direction 102 on the glide surface 104 of the fabric 100. The fill float 122 are preferably either two or three yarns in length. The satin weave fabric is heat set before the coating 130 is applied.

It is believed that the alignment of the float of the yarns in the satin weave, according to the present invention, reduces the coefficient of friction between the fabric 100 and the supply manifold 200, as well as reduces noise generated by the fabric 100 moving over the supply manifold 200. Although satin weave is a preferred fabric construction, other weaving paterns that can provide a yarn float in the gliding direction of the fabric are also considered part of the present invention.

The coating 130 is applied over the surface of the fabric 100 to be positioned adjacent to the supply of air flow. The coating 130 helps reduce the air permeability of the fabric 100. As illustrated, the coating is applied over the gluide surface 104 of the fabric 100. It has been discovered that by applying the coating 130 of the to the'surface of the fabric adjacent to the supply of air flow, the coating helps provide a greater resisitance to air penetration and lowers the possibility of moisture condensing within the fabric. Also, by applying the coating to the glide surface 104, the coating helps reduce the noise generated by the fabric 100 as the fabric 100 moves over the supply manifold 200. The coating 130 also helps reduce fray at the edges of the fabric 100 and around the edges of the apertures 107 in the fabric 100. In one embodiment, the coating 130 is selected from polyurethane, polyacrylate, or a combination thereof. The polyurethane provides good abrasion resistance. However, the polyacrylate has a lower cost factor. A blend of polyurethane and polyacrylate can be used to obtain a desired abrasion resistance and lower cost of the coating material 130.

The fabric 100 is formed by satin weaving the warp yarns 110 and the fill yarns 120. The warp yarns 1 10 are warp drawn. The satin weave of warp yarns 110 and fill yarns 120 are then heat set for dimensional stability. Once the satin weave of warp yarns 110 and fill yarns 120 are heat set, the coating 130 is applied to the desired surface of the fabric 100, e.g., the glide surface 104 of the fabric 100. After the coating 130 has cured on the fabric 100, aperatures 107 can be formed in the fabric 100.

The present invention can be illustrated by the following examples:

EXAMPLE 1

A satin weave was formed from 150/34/1 flat polyester fill yarns and warp yarns, the warp yarns having been warp drawn to form a weave having about 77×62 picks. The satin weave was formed on a water jet loom with a ×1 float crows foot satin weave. The percentage of crimp for the yarn was about 2.0% crimp for the warp yarn and about 3.1% crimp for the fill yarn. The satin weaved fabric was heat set to a temperature of about 400° F. The heat set satin weave was coated with a resin formula having the following constituants:

100 parts by weight of a 40% waterborne polyurethane dispersion (Ru 40-350 from Stahl USA, Peabody, Mass.);
  20 parts by weight of a flame retardant (Amsperse FR 5/1 from Amspec Corp., Gloucester City, N.J.);
  0.6 parts by weight of an antioxident dispersion (Botex 537 from Akron Dispersion, Akron, Ohio);
  0.8 parts by weight of a cellulosic thickener (Natrosol 250 from Hercules Corp., Wilmington, Del.); and
  30 parts by weight of water.

The resin had a viscosity of 12,000 cps (measured on a Brookfield viscometer) and was coated on the satin weave using a floating knife coater. The coating was dried on the fabric at 350° F. for two minutes. The coating was applied to the fabric such that the dried coating weight was at about 0.8 oz/yd$^2$. Apertures were formed in the coated fabric using a die cutter and regular scissors.

The coated fabric had 0.00 cfm air permeability at 125 Pa as measured according to the ASTM D-737 test standard. The coated fabric showed no edge fray when cut with a die cutter or with a regular scissors. After being rolled up tightly on a metal shaft, and aged in a 94° C. oven for three days, the coated fabric also exhibited good resistance to blocking, humidity aging, ozone aging and heat aging according to the ASTM D 5427-93a. Coated fabric also passed the FMVSS 302 flammability test with self-extinguishing rating. When slid across a wedge of polypropylene on the coating side with fabric float perpendicular to the length of the wedge, the coated fabric generated very low noise generating characteristics. The coated fabric-also showed excellent abrasion resistance on the coating side. No change in air permeability was observed after 100,000 cycles sliding on a polypropylene surface.

EXAMPLE 2

The heat-treated satin weave material, as in Example 1, was coated in a similar manner as in Example 1 with a resin formula having the following constituents:

63 parts by weight of the 40% waterborne polyurethane dispersion;
  25 parts by weight of a 45% polyacrylate emulsion (Rhoplex E-32NP from Rohm and Haas, Philadelphia, Pa.);
  50 parts by weight of the flame retardant;
  0.5 parts by weight of the antioxident dispersion;
  31 parts by weight of water; and
  1.0 part by weight of the cellulosic thickener.

The coated fabric had similar properties as the coated fabric in Example 1. However, when the coated fabric was slid across a polypropylene wedge, the coated fabric generated slightly lower noise than the coated fabric for Example 1.

EXAMPLE 3

The heat treated satin weave material, as in Example 1, was coated in a similar manner as Example 1 with a resin formula having the following constituents:

100 parts by weight of the 45% polyacrylate emulsion;
  70 parts by weight of the flame retardant;
  0.8 parts by weight of the antioxidant dispersion;
  40 parts by weight of water; and
  1.0 parts by weight of the cellulosic thickener.

The coating was applied in the same manner as in Example 1, and the coated fabric showed similar performance as the coated fabric from Example 1.

What is claimed is:

1. A fabric for use in diverting airflow in an automotive air conditioning system, comprising:

a warp yarn and a fill yarn combined into a woven pattern with floats and having a first side, a second side, and a longitudinal direction;
  a coating on the first side of the woven patern;
  wherein the woven pattern with the coating thereon further comprises a plurality of apertures to provide differing airflow conditions at different longitudinal postions of the coated woven patern;
  wherein the float of the warp yarn or the fill yarn in the weave is aligned to about the longitudinal direction of the coated woven patern.

2. A fabric according to claim 1, wherein the warp yarn and the fill yarn are flat yarns.

3. A fabric according to claim 1, wherein the warp yarn is warp drawn.

4. A fabric according to, claim 1, wherein the warp yarns and the fill yarns of the woven pattern comprise polyester yarn.

5. A fabric according to claim 1, wherein the float is a float of the fill yarn over the warp yarn.

6. A fabric according to claim 5, wherein said float is over two warp yarns.

7. A fabric according to claim 5, wherein said float is over three warp yarns.

8. A fabric according to claim 5, wherein said warp yarns and said fill yarns are 150/34/1 yarns.

9. A fabric according to claim 5, wherein said warp yarns are warp drawn.

10. A fabric according to claim 1, wherein the woven pattern is a satin weave.

11. A fabric according to claim 10, wherein said satin weave has 77×62 picks.

12. A fabric according to claim 10, wherein said warp yarn has a crimp of about 2.0% and said fill yarn has a crimp of about 3.1%.

13. A fabric according to claim 1, wherein the coating is selected from the group consisting of polyurethane, polyacrylate, or a combination thereof.

14. A fabric according to claim 1, wherein the woven patern of warp yarns and fill yarns is heat set.

* * * * *